United States Patent
Yeh

(10) Patent No.: US 8,625,494 B2
(45) Date of Patent: Jan. 7, 2014

(54) PORTABLE ROUTER AND POWER SAVING CONTROL METHOD THEREOF

(76) Inventor: Hung-Yao Yeh, Taipei (TW)

( * ) Notice: Subject to any disclaimer, the term of this patent is extended or adjusted under 35 U.S.C. 154(b) by 196 days.

(21) Appl. No.: 13/216,578

(22) Filed: Aug. 24, 2011

(65) Prior Publication Data

US 2012/0236770 A1    Sep. 20, 2012

(30) Foreign Application Priority Data

Mar. 16, 2011   (TW) .............................. 100108884 A

(51) Int. Cl.
*H04W 4/00* (2009.01)

(52) U.S. Cl.
USPC ............................ 370/328; 370/401; 370/466

(58) Field of Classification Search
USPC .................. 370/328, 400–401, 466
See application file for complete search history.

(56) References Cited

U.S. PATENT DOCUMENTS

| | | | |
|---|---|---|---|
| 7,778,230 B2 * | 8/2010 | Fulknier et al. ............... | 370/338 |
| 2006/0013173 A1 * | 1/2006 | Rinne et al. .................. | 370/338 |
| 2007/0204072 A1 * | 8/2007 | Doan et al. ...................... | 710/19 |
| 2008/0123575 A1 * | 5/2008 | Jaakkola ........................ | 370/311 |
| 2009/0040990 A1 * | 2/2009 | Xhafa et al. ................... | 370/338 |
| 2011/0239024 A1 * | 9/2011 | Hsieh et al. .................... | 713/323 |

* cited by examiner

*Primary Examiner* — Phuc Tran
(74) *Attorney, Agent, or Firm* — Thomas | Horstemeyer, LLP

(57) ABSTRACT

The invention discloses a portable router and a power saving control method thereof. The portable router is capable of routing a signal among the network end and at least one electronic device. Each of the at least one electronic device has a wireless data transmitting function. The portable router comprises a first network module, a second network module, a sensing module and a data processing module. The first network module and the second network module can be switched on or off independently, the first network module is capable of exchanging signal to the network end by the first format, the second module is capable of exchanging the signal to the at least one electronic device by the second format. The sensing module is electronically connected with the network end for generating a status signal in accordance with the pre-determined state. The data processing module is capable of determining and processing a pre-determined function in accordance with the status signal and the pre-determined order.

17 Claims, 5 Drawing Sheets

PORTABLE ROUTER AND POWER SAVING CONTROL METHOD THEREOF

CROSS-REFERENCE TO RELATED APPLICATION

This application claims priority to Taiwan Patent Application entitled "PORTABLE ROUTER AND POWER SAVING CONTROL METHOD THEREOF" having serial number 100108887, filed on Mar. 16, 2011, which is incorporated by reference in its entirety.

BACKGROUND OF THE INVENTION

1. Field of the Invention

The present invention discloses a portable router which is capable of adjusting the power supplying status of the modules of the portable router respectively in accordance with the loading of the portable routing device 2. Description of the Prior Art Router is a computer network device, capable of transmitting packages to a receiving end via the network, the said process is called as routing.

The well-known portable router of the prior art is only a simple combination of the wireless network routing device and cellular data interface. However, since most of the portable devices are capable of obtaining electricity directly from the grid-connected electricity network or dedicated battery, therefore, the problem of power saving of the portable router is not been focused by the one skilled in the art. However, since the latest version of the portable router is now able to be integrated into the smart phone, providing the smart phone the capability of routing so as to provide the electronic device having wireless transmission function to get access to the network via the smart phone having routing function. Since the power that can be provided by the battery of the smart phone is limited, therefore, the power consumption rate of the portable router become one of the main features to distinguish the quality of the portable router.

In the prior art, disregarding the loading of the portable routing device, the portable router maintains the connection with the portable routing device by consistently exchanging data with the electronic devices, resulting in the unnecessary power consumption. In order to overcome the said problem, the prior art utilized a switch on/switch off function to allow the user to switch off the routing function while the routing function is not in use. However, while the routing function is turned off, the user has to turn on the routing function manually before the electronic device is able to get access to the network via the portable routing device.

Therefore, a need exists, for a portable routing device that is capable of decreasing the power consumption rate by adjusting the power supplying status of the modules disposed therein respectively in accordance with the loading of the portable routing device.

SUMMARY OF THE INVENTION

In one aspect of the invention, a portable router is provided. The portable router is utilized to establish a connection between a network end and at least one electronic device. The portable router also has a wireless data transmitting function. The portable router previously described comprises a first network module, a second network module, a sensing module and a data processing module. The first network module, utilized to communicate with the network end with the first format, is capable of being switched on or off independently. The second network module, utilized to communicate with the electronic device with the second format, capable of being switched on or off independently. The sensing module, electronically connected with the network end, utilized to generate a condition signal in accordance with a pre-determined condition. The data processing module utilized to execute a pre-determined function in accordance with the condition signal or a pre-determined command, wherein the pre-determined command is defined by a user.

In actual practice, the first format is Wireless Wide-area Data Network such as GPRS, EDGE, WCDMA, EVDO, TD-SCDMA, HS(D/U)PA, HSPA+, LTE or WiMAX, the second format is Wireless Local Area Network.

Furthermore, the present invention can further comprises a third network module, which is utilized to exchange data with electronic device, the third network module can be switched on or off independently, wherein the electronic devices support a Wireless Person Area Network.

Furthermore, the present invention can further comprise an interface module, electronically connected with the data processing module, for providing a user interface to display the condition of the portable router to the user or to obtain the pre-determined command from the user.

Meanwhile, the pre-determined function previously described comprises a timing control function, the timing control function is capable of controlling the first network module or the second network module to switch on or off the first network module or the second network module individually or simultaneously, or setting the data processing module to a power saving mode or an active mode at an indicated time or a time period.

Nevertheless, the pre-determined function can further comprises an electronic device summoning function, the electronic device summoning function is capable of sending a signal to an electronic device to switch on the electronic device, determining a routing order of the electronic device or transmitting data to the electronic device. Furthermore, the pre-determined condition is that a signal is received by the sensing module or the first network module from the network end.

Another aspect of the invention generally provides a controlling method of a portable router for saving power, the portable router comprising a first network module, a second network module, a sensing module and a data processing module, the portable router is utilized to establish a connection between a network end and distributing the signal from the network end to the electronic device. The electronic device has a wireless data transmitting function. The controlling method of the invention comprises the steps of step S1, step S2 and S3.

Step S1 is to execute an initialization process to obtain a first condition from a user and set the data processing module to a power saving mode. Step S2 is to determine if the portable router matches the first condition, if yes, execute the first process to switch on or off the first network module or the second network module individually or simultaneously, or set the data processing module to a power saving mode or an active mode. And the step S3 is to determine if the portable router matches the second condition, if yes, execute a second process to switch on or off the first network module or the second network module individually or simultaneously, or set the data processing module to a power saving mode or an active mode, if no, execute a third process.

Meanwhile, in the actual practice, the initialization process comprises the Step S11 to Step S15. The step S11 is to obtain the first condition from the user; the step S12 is to establish a connecting between the portable router and the electronic device. The step S13 is to create an electronic device list; the step S14 is to count the time length of the data processing module in the active mode; and the step S15 is to determine if the time length of the data processing module in the active mode reaches the first timing threshold, if yes, set the data processing module to the power saving mode. Meanwhile, the first timing threshold is an indicate time or an indicate time period Furthermore, in actual practice, the first condition is that the first network module switched off and the time length that the data processing module at the power saving mode reaches the second time threshold, the first process is corresponding to the first condition. The first process comprises the steps of the step S22, the step S24, the step S26 and the Step S28.

However, the first condition can also be that the first network module is switched on and a signal or a user data is received by the first network module from the network end, the first process corresponding to the first condition comprises the step S22, step S24 and the step S28. The step S22 is to determine if the portable router matching with the first condition, if yes, execute the step S24 and step 28. The step S24 is to set the data processing module to an active mode. The step 28 is to establish an internet connection to the network end via the first network module.

Meanwhile, the first condition can also be that the sensing module of the portable router accepts a signal from the network end, the first process corresponding to the first condition comprises the step S22, step S24, step S26 and step S28. The step S22 is to determine if the portable router matching with the first condition, if yes, execute the step S24, step S26 and step 28. The step 24 is to set the data processing module to an active mode. The step 26 is to switch on the first network module. The step 28 is to establish an internet connection to the network end via the first network module.

In actual practice, the second condition is that a signal or a user data is detected from the network end, the second process corresponding to the second condition comprises the step of S32. The step 32 is to determine if the at least one electronic device matches the routing order, if yes, switch on or switching off the first network module, the second network module or switching the data processing module among the active mode or the power saving mode; if no, save the user data or alerting the user for updates. Furthermore, the step S32 comprises the following sub-steps of step S322, step S324, step S326 and step S328. Step S322 is to determine if the at least one electronic device 3 matches a routing order, if yes, execute step S324, step S326 and step S329; if not, execute step S328 and step S38. The step S324 is to switch on the second network module 12. The step S326 is to transmit the data of the user to the at least one electronic device 3 via the network module. The step S328 is to save the user data or alert the user for update. The step S38 is to set the data processing module to the power saving mode. The step S329 is to set the data processing module to the power saving mode under a predetermined condition. The pre-determined condition may refer to the condition that no user data transmission within a pre-determined period.

Meanwhile, the second condition can also be the electronic device match a routing order, the second process corresponding to the second condition comprises the step of S324, step S326 and the step S329. The step S324 is to switch on the second network module. The step S326 is to transmit the data of the user to the at least one electronic device via the network module. The step S329 is to set the data processing module to the power saving mode.

In actual practice, the third process comprises the following steps of step S36 and step S38. The step S36 is to switch off the first network module and reset the time length of the data processing module to be in the active mode respectively; and the step S38 is to set the data processing module to the power saving mode.

The third process may also comprise the steps of S328 and the step S38. The step S328 is to save the user data or alerting the user for update; and the step S38 is to set the data processing module to the power saving mode.

Another aspect of the invention generally provides a controlling method of a portable router for saving power, the portable router comprises a first network module, a second network module and a data processing module. The portable router is utilized to establish a connection between a network end and distribute the signal from the network end to the electronic device. The electronic device has a wireless data transmitting function. The controlling method comprises the following steps of step S1, step S2 and the step S3.

The step S1 is to execute an initialization process to obtain a first condition from a user and set the data processing module to a power saving mode. The step S2 is to determine if the portable router matches the first condition, if yes, execute the first process to switch on or off the first network module or the second network module individually or simultaneously, or set the data processing module to power saving mode or an active mode. The step S3 is to determine if the portable router matches the second condition, if yes, execute a second process to switch on or off the first network module or the second network module individually or simultaneously, or set the data processing module to a power saving mode or an active mode, if no, execute a third process.

BRIEF DESCRIPTION OF THE APPENDED DRAWINGS

The teachings of the present invention can be readily understood by considering the following detailed description in conjunction with the accompanying drawings, in which.

DETAILED DESCRIPTION OF THE INVENTION

Figure 1:
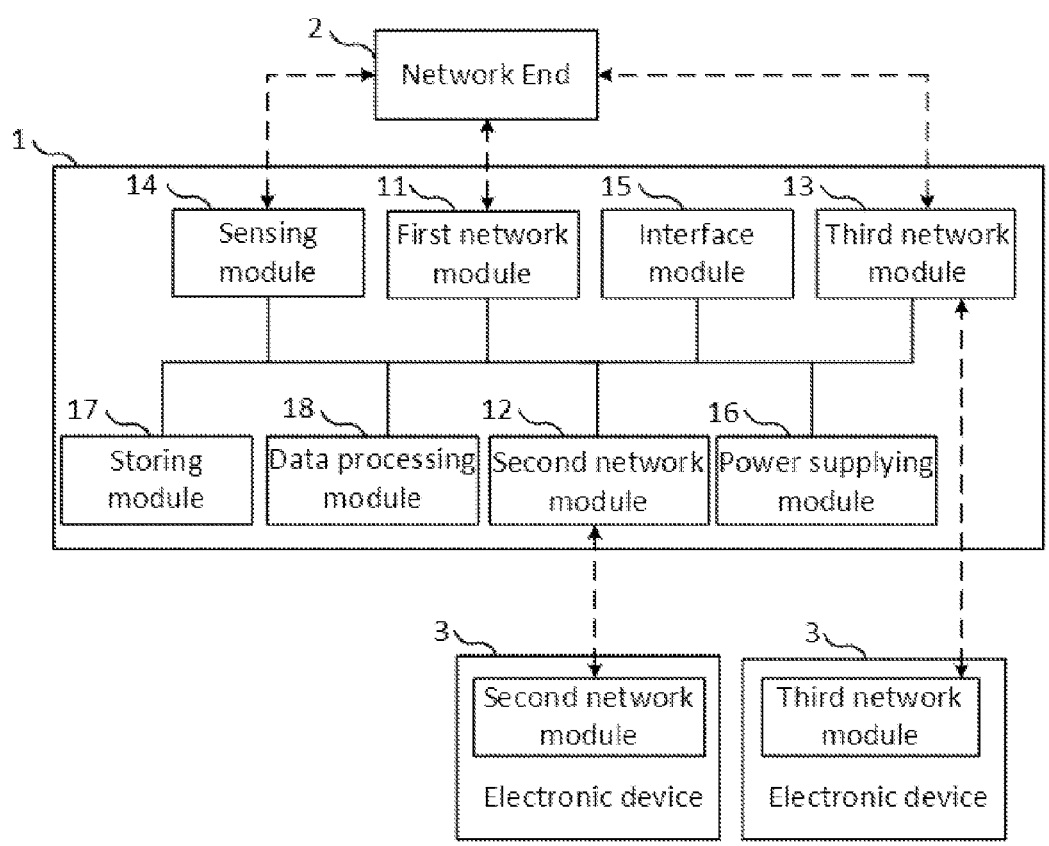
FIG. 1 depicts a function block diagram of one of the embodiment of the portable router 1 of the present invention.

The present invention generally provides a portable router 1 and the power saving control method thereof. Please refer to the FIG. 1, the FIG. 1 depicts a function block diagram of one of the preferred embodiment of the portable router of the present invention. The present invention discloses a portable router 1, utilized to establish a connection between a network end 2 and at least one electronic devices 3. Each of the electronic device 3 has a wireless data transmitting function. In the present embodiment, the amount of the electronic device 3 that the portable router 1 is able to support is larger than 2. Furthermore, the portable router 1 of the present invention comprises a first network module 11, a second network module 12, a third network module 13, a sensing module 14, an interface module 15, a power supplying module 16, a storage module 17 and a data processing module 18. However, depend on the requirement of the user, the modules consisted in the portable router 1 can be modified accordingly. For example, the third network module 13 or second network module 12 in the portable router 1 can be optionally removed in accordance with the demand of the user.

The network end 2 of the present invention generally refers to a network provider which the portable router 1 is capable of sending, accepting or exchanging data or signal therewith. The network end 2 may be a wireless form network source or a wire connected network source. Furthermore, in the present embodiment, the network end 2 refers to an internet source utilizing LTE format.

Furthermore, the electronic device 3 of the present invention generally refers to an electronic device 3 having a wireless data transmitting function. In the present embodiment, the electronic device 3 can be, but not limited to be a laptop computer. The electronic device 3 can also be a digital camera, an electronic book, pad shaped or desktop computer, smart phone or any other electronic device 3 having the wireless data transmitting function. Furthermore, the present invention of portable router 1 is capable of connecting a plurality of electronic devices 3 with the network end 2 simultaneously.

The first network module 11 is utilized to communicate with the network end 2 with a first format for exchanging data or signal therewith. Different from the prior art, the first network 11 of the present invention can be switched on or switched off independently in accordance with the setting configured by the user via the interface module 15 during an initialization process. In the present embodiment, the first network module 11 of the present invention is a wireless network adapter, which the corresponding first format is a LTE. However, the first network module 11 of the present invention is not limited to the wireless network adapter, according to the requirement of the user, the first network module 11 can also be a traditional network adapter utilizing cable to connect therewith. Furthermore, the first format is not limited to LTE, the first format can also be GPRS, EDGE, WCDMA, EVDO, TD-SCDMA, HS(D/U)PA, HSPA+, WIMAX, any other related Wireless Wide Area Network format or the composition thereof.

Nevertheless, the first network module 11 can also be switched on or off in accordance with the conditions of the other modules of the portable router 1 to maximize the electricity efficiency thereof. The said conditions of the modules generally refer to the power supplying status, the timing of being switched on or off, the time length of the modules which is turned on, turned off, in the active mode or in the inactive mode. The condition of the module may also refer to the status that the module receives signal or data.

The second network module 12 is utilized to communicate with the electronic device 3 with a second format for exchanging data or signal therewith. The second network module 12 can be switched on or switched off independently. The second network module 12 can also be capable of conferring a local IP address to each of the said electronic devices 3 for tracking or maintaining the connection with the electronic device 3, then, the said local IP addresses can be stored in a storing module 17 connected with the second network module 12 by a form of address mapping table. The second network module 12 is utilized to construct a wireless LAN, WLAN, using no conducting or transmitting cable but microwave as the transmission mean. Accordingly, the electronic devices 3 are able to get access to the network end 2 via the WLAN constructed by the portable router 1 of the present invention.

Similar to the first network module 11, the second network module 12 of the present invention can be switched on or switched off independently in accordance with the setting configured by the user via the interface module 15 during an initialization process. Nevertheless, the second network module 12 can also be switched on or switched off in accordance with the conditions of the other modules of the portable router 1 in order to maximize the electricity efficiency thereof. The definition of the condition of the other modules will be omitted herein for the clarity of the specification since it has already been described previously.

The third network module 13, supporting a Wireless Person Area Network, is utilized to establish a connection between a cellular network and the electronic device 3 for allowing the electronic device 3 which supporting WPAN to communicate or to exchange signal or data therewith. Similar to the first network module 11, the third network module 13 can also be switched on or off independently.

In the present embodiment, the third network module 13 can be, but not limited to, a blue-teeth transmitting module, the third network module 13 can also be any other wireless transmission means which support WPAN, such as infra-red, magnetic wave or light wave.

In the present embodiment, the sensing module 14 is electronically connected with the network end 2 to maintain switched on and sense the condition of the network end 2 and generate a condition signal to the data processing module 18 in accordance with a pre-determined condition.

Since the sensing module 14 is utilized to sense the condition of the network end 2 so as to transmit a corresponding signal to the data processing module 18, the sensing module 14 does not share the main function of the first network module 11, the second network module 12 and the third network module 13, therefore, the sensing module 14 has a relatively low power consumption rate.

In order to decrease the power consumption rate of the portable router 1 of the present invention, the first network module 11, second network module 12 and the third network module 13 will be switch off while the portable router 1 is not in used. Meanwhile, the sensing module 14 keep monitoring the network end 2. The sensing module 14 shall generate a condition signal in accordance with the status of the network end 2 and send the condition signal to the data processing module 18. With the condition signal, the data processing module 18 is capable of activating the first network module 11, the second network module 12 or the third network module 13 individually or simultaneously in accordance with the condition signal or pre-determined command to decrease the power consumption rate.

In the present embodiment, the data processing module 18 refer to a central processing unit, which is electronically connected to the other modules or components of the portable router 1 of the present invention. The data processing module 18 is capable of switching on, switching off the modules in accordance with the signal or data received from the other modules of the portable router 1. Furthermore, the data processing module 18 is also capable of controlling the said modules in the portable router 1 to transmit or encode data therebetween.

The data processing module 18 is also capable of processing an indicate function in accordance with the condition signal or a predetermined command, wherein the said indicate function comprises a timing control function and an electronic devices summoning function.

The timing control function is generally indicated to a function that is capable of controlling the first network module 11, the second network module 12 and the third network module 13 to be switched on or switched off individually or simultaneously in accordance with the setting of the initialization process configured by the user, wherein the setting may comprises a parameter of an indicate time, an indicate time period, a relative time or a relative time period. Furthermore, the timing control function can also be capable of switching the data processing module 18 among the power saving mode and active mode.

The indicate time or indicate time period refers to an explicit time or an explicit time period, for example, the explicit time period may represent the time period of 12 o'clock at noon to the 2 pm of everyday. The relative time period may refer to the time length after finishing the initialization process.

Furthermore, the power saving mode and the active mode of the data processing module 18 are a relative concept which is defined by the power consumption rate thereof. While the data processing module 18 is in the power saving mode, the power consumption rate is lower than the active mode, meanwhile the processing capability thereof may also be decreased correspondingly in order to save the power consumed while the power consumption requirement of the system is relatively low. The data processing module 18 may react in accordance with the condition signal. Nevertheless, the condition signal previously described refers to a signal generated by the sensing module 14 while a pre-determined condition is achieved thereby.

The power supplying module 16 is electronically connected with the other modules of the portable router 1. The power supplying module 16 is capable of selectively providing the power to the indicate module to let the indicate module to be switched on or switched off in accordance with the signal sent by the data processing module 18.

The interface module 15, electronically connected with the data processing module 18, is for providing a user interface to display a status of portable router 1 to the user so as to let the user input a pre-determined command. In the present embodiment, the interface module 15 comprises, but not limited to, a display monitor and a keypad. However, the interface module 15 can also be a touch pad, a module having voice identifying function, a module having gesture recognition function or any other forms of inputting or outputting means in accordance with the requirement of the user.

Figure 2:
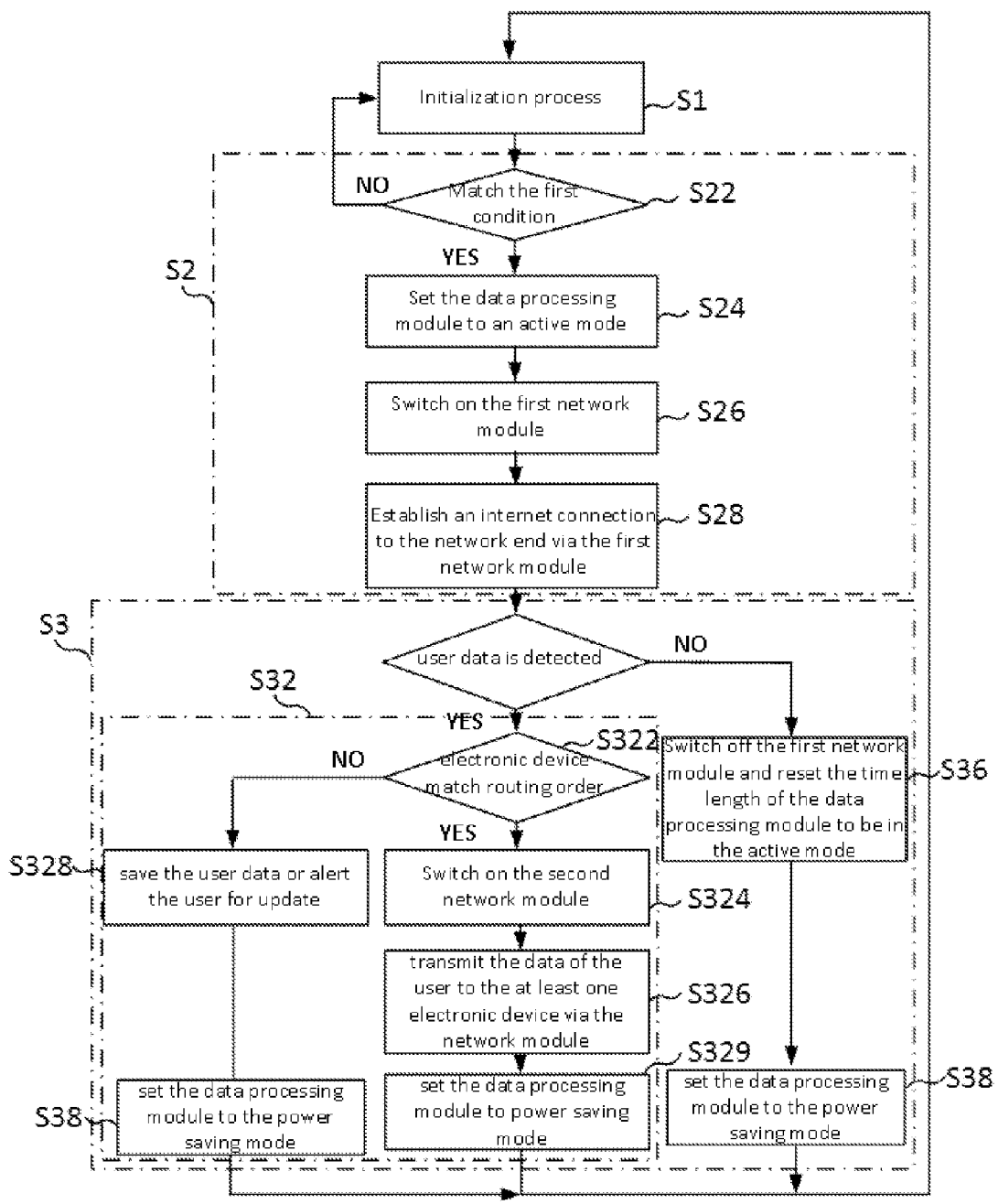
FIG. 2 depicts a flow chart diagram of the embodiment of the controlling method for saving power of the present invention.
Figure 3:
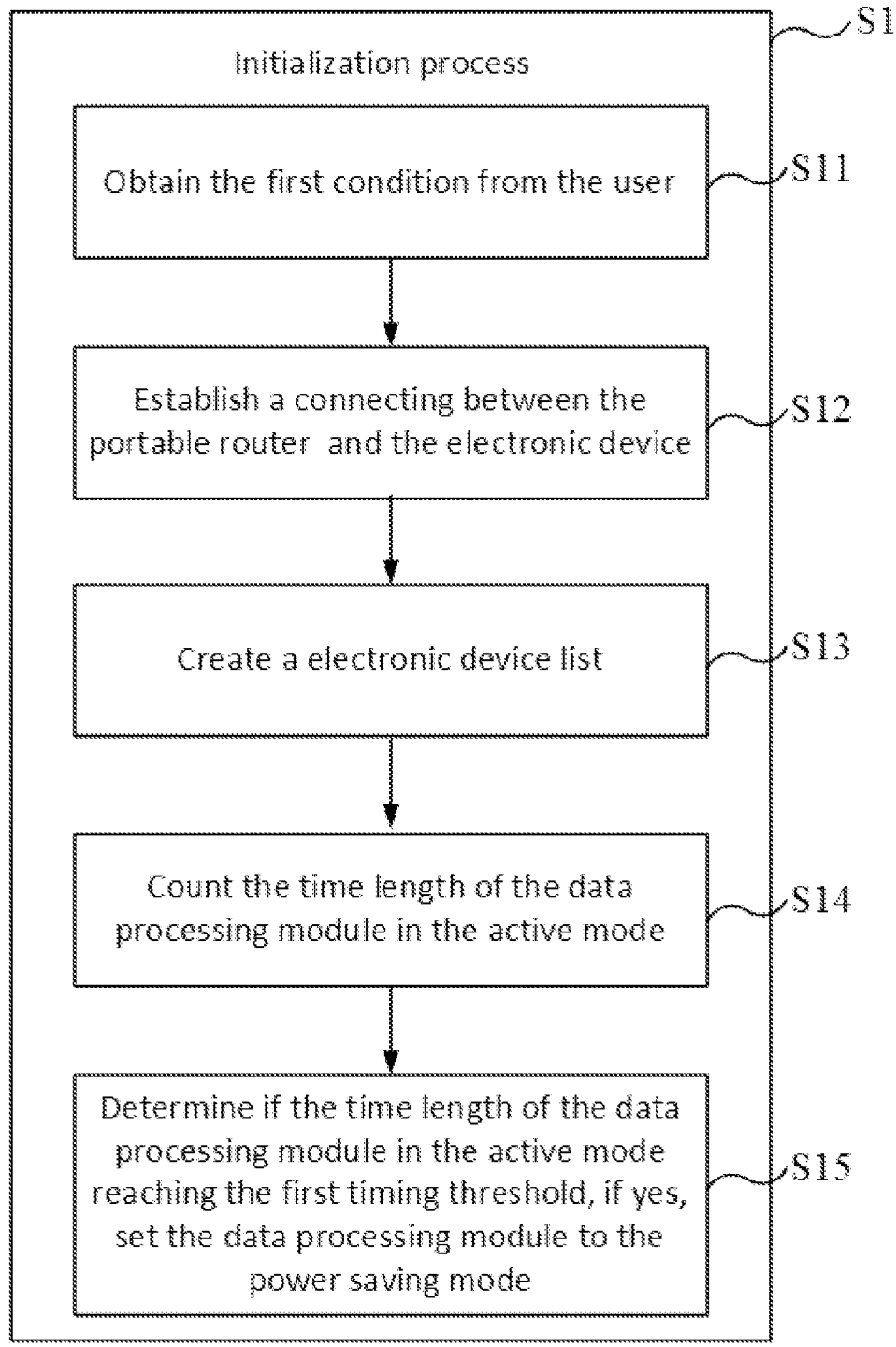
FIG. 3 depicts a flow chart diagram of the embodiment of the initialization process of the present invention.

Please refer the FIG. 2, the FIG. 2 depicts a flow chart diagram of the embodiment of the controlling method of a portable router for saving power. In the present embodiment, the portable router 1 comprises a first network module 11, a second network module 12, a third network module 13, a sensing module 14, an interface module 15, a power supplying module 16 and a data processing module 18. The portable router 1 is utilized to establish a connection among a network end 2 and the electronic devices 3, so as to distribute the signal from the network end 2 to the electronic devices 3. The electronic devices 3 has a wireless data transmitting function. The controlling method for saving power of the present invention comprises step S1, Step S2 and Step S3.

The step S1 is to execute an initialization process to obtain a first condition from a user and set the data processing module 18 to a power saving mode. The said initialization process comprises a plurality of sub-steps, which comprises step S11, step S12, step S13, step S14 and step S15.

The step S11 is to obtain the first condition from the user, the user may know the status of the portable router 1 via the interface module 15 and set the first condition accordingly thereby. In the present embodiment, the first condition is that the first network module 11 is switched off and the time length that the data processing module 18 at the power saving mode reaches the second time threshold. In summary, the first condition is that the first network module 11 is switched off and the indicate time or time length of the data processing module 18 is in the power saving mode. However, the first condition is not limited to the said example, the first condition can also be fulfilled while the first network module 11 is switched on and the first network module 11 of the portable receives a user data or signal from the network end 2. The first condition may also be that the sensing module 14 accepts a signal from the network end 2.

The step S12 is to establish a connecting between the portable router 1 and the electronic device 3.

The step S13 is to create an electronic device 3 list, wherein the electronic device 3 list is an Internal Router or Address Mapping Table. The electronic device 3 list is utilized to authorize an IP address to the electronic devices 3 respectively to identify the path of data transmission.

The step S14 is to count the time length of the data processing module 18 in the active mode for obtaining the time length that the portable router 1 in the active mode and without data transmission.

The step S15 is to determine if the time length of the data processing module 18 in the active mode reaches the first timing threshold, if yes, set the data processing module 18 to the power saving mode; if no, then repeat the step S15 after a pre-determined period of time. Furthermore, the first timing threshold can be configured by the user, wherein the first timing threshold may comprise a parameter of indicate time, an indicate time period, a relative time or a relative time period, since the definition of the time related terms are described previously, it will be omitted herein for the clarity of the specification.

Please refer to the FIG. 2, after finishing the initiation process, the step S2 is then executed. The step S2 is to determine if the portable router 1 matches to the first condition, if yes, execute the first process to switch on or switch off the first network module 11 or the second network module 12 individually or simultaneously, or set the data processing module 18 to a power saving mode or an active mode.

In the present embodiment, the said first condition refers to the condition that the first network module 11 is switched off and the time length that the data processing module 18 at the power saving mode reaches the second time threshold, the first process is corresponding to the first condition. Furthermore, the second timing threshold can be configured by the user, wherein the second timing threshold may be a parameter of an indicate time, an indicate time period, a relative time or a relative time period. The definition of the time related terms will be omitted herein for the clarity of the specification since it has been described previously.

In the present embodiment, the step S2 further comprises a plurality of sub-steps, which is the step S22, the step S24, the step S26 and the step S28. The step S22 is to determine if the portable router 1 matches with the first condition, if yes, execute the step S24, step S26 and step S28 correspondingly. The step S24 is to set the data processing module 18 to an active mode. The step S26 is to switch on the first network module 11. The step S28 is to establish an internet connection to the network end 2 via the first network module 11.

After finishing the step S2, then execute step S3. The Step S3 of the present invention is to determine if the portable router 1 matches the second condition, if yes, execute a second process to switch on or off the first network module 11 or the second network module 12 individually or simultaneously, or set the data processing module 18 to a power saving mode or an active mode, if no, execute a third process.

In the present embodiment, the second condition is that a signal or a user data is detected from the network end 2. Correspondingly, the second process corresponding to the second condition comprises the step S32, step S32 is to determine if the at least one electronic device 3 matches the routing order, if yes, switch on or switching off the first network module 11, the second network module 12 or switching the data processing module 18 among the active mode or the power saving mode; if no, save the user data or alerting the user for update.

The step S32 comprises step 322, step 324, step 326, step 328, step 38 and step 329.

The step S322 is to determine if the at least one electronic device 3 matches with a routing order, if yes, execute step S324, step S326 and step S329; if not, execute step S328 and step S38;

The step S324 is to switch on the second network module 12. The step S326 is to transmit the data of the user to the at least one electronic device 3 via the network module. The step S328 is to save the user data or alert the user for updating. The step S38 is to set the data processing module 18 to the power saving mode. The step S329 is to set the data processing module 18 to the power saving mode, more specifically, the step S38 is to set the data processing module 18 to the power saving mode instantly. The step S329 is to set the data processing module 18 to the power saving mode under a pre-determined condition. The pre-determined condition may refer to the condition that no user data transmission within a pre-determined time period.

Figure 4:
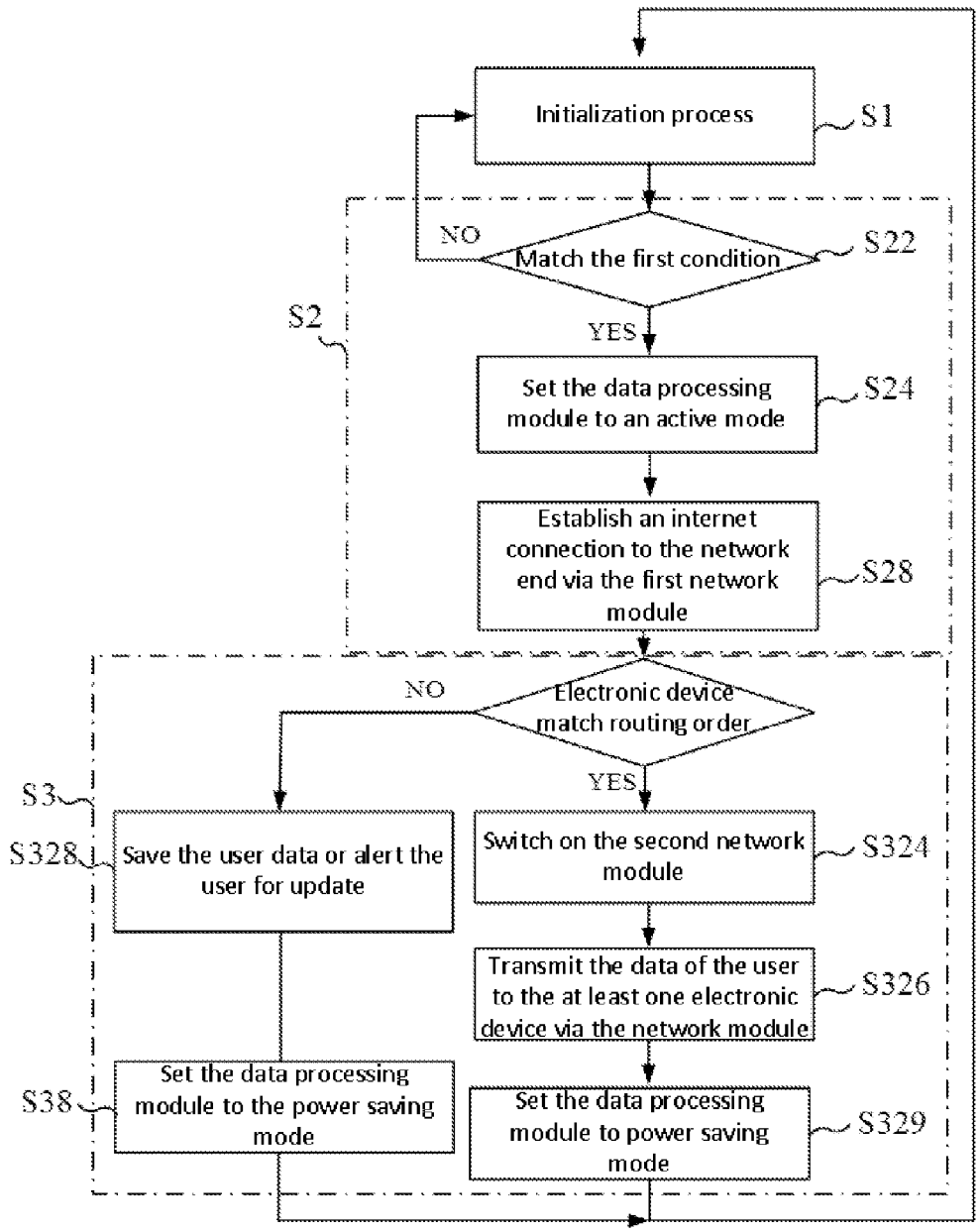
FIG. 4 depicts a flow chart diagram of the another embodiment of the initialization process of the present invention.

Furthermore, please refer to the FIG. 4, the FIG. 4 depicts a flow chart diagram of another embodiment of the initialization process of the present invention. Some of the descriptions of the steps are omitted herein for the clarity since the descriptions of the FIG. 4 is similar to the FIG. 2.

Please refer to the FIG. 4, the step S1 of the present embodiment is the same as the FIG. 2. However, the step S2 of the present invention is different from the previous embodiment since the first condition is that the first network module 11 is switched on and a signal or a user data is received by the first network module 11 from the network end 2. Furthermore, the first process corresponding to the first condition comprises the step S22, the step S24 and the step S28.

The step S22 is to determine if the portable router 1 matching with the first condition, if yes, execute the step S24 and step 28. The step S24 is to set the data processing module 18 to an active mode. The step S28 is to establish an internet connection to the network end 2 via the first network module 11.

Furthermore, in the present embodiment, the second condition of the step S3 and the corresponding second process is different from the embodiment present in the FIG. 2. In the present embodiment, the second condition is that the electronic device 3 matches a routing order.

The second process corresponding to the second condition comprising the step S324, step S326 and step S329.

The step S324 is to switch on the second network module 12; the step S326 is to transmit the data of the user to the at least one electronic device 3 via the network module; the step S329 is to set the data processing module 18 to the power saving mode. More specifically, the step S329 is to set the data processing module 18 to the power saving mode under a pre-determined condition. The pre-determined condition may refer to no user data transmission within a pre-determined time period.

Furthermore, the third process corresponding to the present embodiment further comprises step S328 and step S38. The step S328 is to save the user data or alert the user for update. The step S38 is to set the data processing module 18 to the power saving mode. More specifically, the step S38 is to set the data processing module 18 to the power saving mode instantly, wherein the said alerting refer to the means that utilized to remind the user. The said means may be online communicating software, email, SMS, visual warning, vibrating, sound effect or any other related means.

Figure 5:
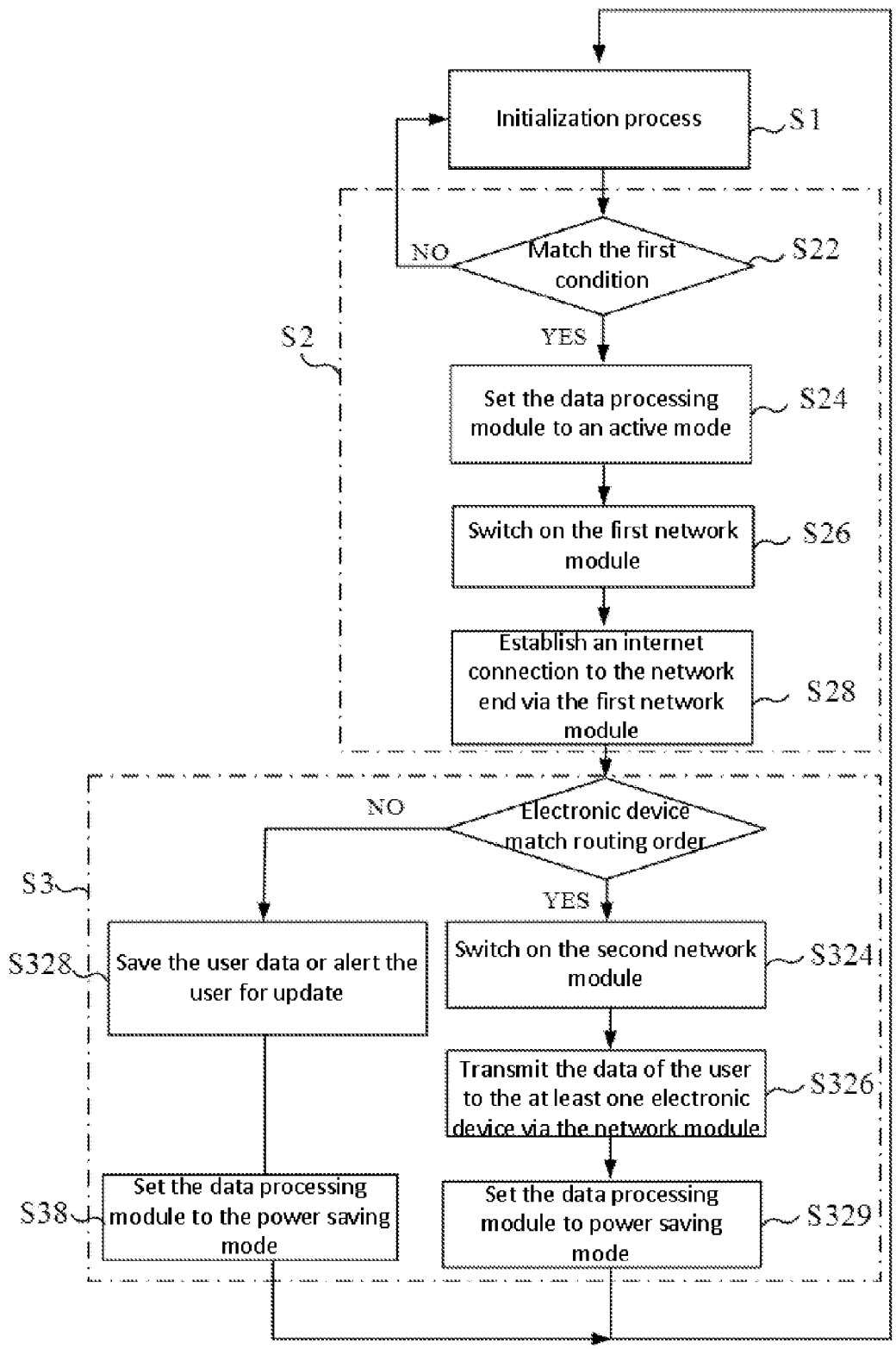
FIG. 5 depicts a flow chart diagram of the another embodiment of the initialization process of the present invention.

Please refer to the FIG. 5, the FIG. 5 depicts a flow chart diagram of another embodiment of the initialization process of the present invention. Since the step S1 and the step S3 is the same as the embodiment of the FIG. 4, some of the descriptions of the steps are omitted herein for the clarity. In the present embodiment, the first condition refers to the condition that the first network module 11 is switched off and the time length that the data processing module 18 at the power saving mode reaches the second time threshold, the first process is corresponding to the first condition. Accordingly, the corresponding first process comprises step S22, step S24, step S26 and step S28. The step S22 is to determine if the portable router 1 matches with the first condition, if yes, execute the step S24, step S26 and step 28. The step S24 is to set the data processing module 18 as an active mode; the step S26 is to switch on the first network module 11, and the step S28 is to establish an internet connection to the network end 2 via the first network module 11.

In summary, the portable router 1 of the present invention and the controlling method for saving power thereof are able to saving the power by adjusting the power distribution among the module in the portable router 1 without affecting the using experience of the user, so as to solve the problem of high power consumption and inconvenience of the prior art.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A portable router, utilized to establish a connection between a network end and at least one electronic device, the electronic device having a wireless data transmitting function, the portable router comprising:
   a first network module, utilized to communicate with the network end with a first format, wherein the first network module is capable of being switched on or off independently;
   a second network module, utilized to communicate with the electronic device with a second format, wherein the second network module is capable of being switched on or off independently;
   a sensing module, electronically connected with the network end for generating a condition signal in accordance with a pre-determined condition;
   a data processing module, utilized to execute a pre-determined function in accordance with the condition signal or a pre-determined command; and
   an interface module, the interface module electronically connected with the data processing module, for providing a user interface to display the condition of the portable router to a user or to obtain the pre-determined command from the user.

2. The portable router of claim 1, wherein the first format is Mobile Wide Area Data Network, the second format is Wireless Local Area Network.

3. The portable router of claim 1, further comprising a third network module, the third network module utilized to exchange data with electronic device, wherein the third network module can be switched on or off independently, the electronic devices support a Wireless Person Area Network.

4. The portable router of claim 1, wherein the pre-determined function comprises a timing control function, the timing control function is capable of controlling the first network module or the second network module to switch on or off the first network module or the second network module individually or simultaneously, or setting the data processing module to a power saving mode or an active mode at an indicate time or an indicate time period.

5. The portable router of claim 1, wherein the pre-determined function comprises an electronic devices summoning function, the electronic devices summoning function is capable of sending a signal to an electronic device to switch on the electronic device, determining a routing order of the electronic device or transmitting data to the electronic device.

6. The portable router of claim 1, wherein the pre-determined command is defined by a user.

7. The portable router of claim 1, wherein the pre-determined condition is that a signal is received by the sensing module or the first network module from the network end.

8. A controlling method of a portable router for saving power, the portable router comprising a first network module, a second network module, a sensing module and a data processing module, the portable router utilized to establish a connection between a network end and distributing a signal from the network end to the electronic device, the electronic device having a wireless data transmitting function, the controlling method comprising the following steps:
   S1: executing an initialization process to obtain a first condition from a user and set the data processing module to a power saving mode, the initialization process comprising the following steps of:
      S11: obtaining the first condition from the user;
      S12: establishing a connection between the portable router and the electronic device;
      S13: creating an electronic device list;
      S14: counting a time length of the data processing module in an active mode; and
      S15: determining if the time length of the data processing module in the active mode reaches a first timing threshold; if yes, set the data processing module to the power saving mode;
   S2: determining if the portable router matches the first condition; if yes, execute the first process to switch on or off the first network module or the second network module individually or simultaneously, or set the data processing module to the power saving mode or the active mode; and
   S3: determining if the portable router matches the second condition; if yes, execute a second process to switch on or off the first network module or the second network module individually or simultaneously, or set the data processing module to the power saving mode or the active mode if no, execute a third process.

9. The controlling method of the claim 8, wherein the first timing threshold is an indicated time or an indicated time period.

10. The controlling method of the claim 8, wherein the first condition is that the first network module is switched off and the time length is that the data processing module at the power saving mode reaches the second time threshold, the first process is corresponding to the first condition, the first process comprises the following steps:
   S22: determining if the portable router matches with the first condition; if yes, execute the step S24, step S26 and step 28;
   S24: setting the data processing module to the active mode;
   S26: switching on the first network module; and
   S28: establishing an internet connection to the network end via the first network module.

11. The controlling method of the claim 8, wherein the first condition is that the first network module is switched on and a signal or a user data is received by the first network module from the network end, the first process corresponding to the first condition comprises the following steps:
   S22: determining if the portable router matches with the first condition; if yes, execute the step S24 and step 28;
   S24: setting the data processing module to the active mode; and
   S28: establishing an internet connection to the network end via the first network module.

12. The controlling method of the claim 8, wherein the first condition is that the sensing module of the portable router accepts a signal from the network end, the first process corresponding to the first condition comprises the following steps:
   S22: determining if the portable router matches with the first condition; if yes, execute the step S24, step S26 and step 28;
   S24: setting the data processing module to the active mode;
   S26: switching on the first network module; and
   S28: establishing an internet connection to the network end via the first network module.

13. The controlling method of the claim 8, wherein the second condition is that a signal or a user data is detected from the network end, the second process corresponding to the second condition comprises the following steps:
   S32: determining if the at least one electronic device matches the routing order; if yes, switch on or switch off the first network module, the second network module or switch the data processing module among the active mode or the power saving mode; if no, save the user data or alert the user for update.

14. The controlling method of the claim 13, wherein the step S32 comprises the following steps:
   S322: determining if the at least one electronic device matches a routing order; if yes, execute step S324, step S326 and step S329; if not, execute step S328 and step S38;
   S324: switching on the second network module;
   S326: transmitting the data of the user to the at least one electronic device via the network module;
   S328: saving the user data or alerting the user for updating;
   S38: setting the data processing module to the power saving mode; and
   S329: setting the data processing module to the power saving mode.

15. The controlling method of the claim 8, wherein the second condition is that the electronic device matches a routing order, the second process corresponding to the second condition comprises the following steps:
   S324: switching on the second network module;
   S326: transmitting the data of the user to the at least one electronic device via the network module; and
   S329: setting the data processing module to the power saving mode.

16. The controlling method of the claim 8, wherein the third process comprises the following steps:
   S36: switching off the first network module and resetting the time length of the data processing module to be in the active mode respectively; and
   S38: setting the data processing module to the power saving mode.

17. The controlling method of the claim 8, wherein the third process comprises the following steps:
   S328: saving the user data or alerting the user for updating; and
   S38: setting the data processing module to the power saving mode.

\* \* \* \* \*